United States Patent

Wah Wat

[11] 3,910,894
[45] Oct. 7, 1975

[54] INSECT HORMONE MIMICS
[75] Inventor: Edward Koon Wah Wat, Wilmington, Del.
[73] Assignee: E. I. Du Pont de Nemours and Company, Wilmington, Del.
[22] Filed: May 14, 1970
[21] Appl. No.: 37,352

[52] U.S. Cl. .......... 260/240 H; 424/278; 424/339; 424/340; 260/348 R; 260/348.6
[51] Int. Cl.² ...................................... C07D 308/28
[58] Field of Search ...................... 260/240 H, 348

[56] References Cited
UNITED STATES PATENTS
3,563,982   2/1971   Bowers .......................... 260/240 H OTHER PUBLICATIONS
Bowers I, Science Vol. 164, pp. 323-325 (Apr. 18, 1969).
Chemical Abstracts, Vol. 74, p. 298 (abstract No. 22682d), 1971.

*Primary Examiner*—John D. Randolph

[57] ABSTRACT

Compounds are described having the formula

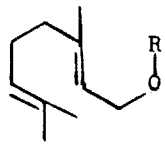 or 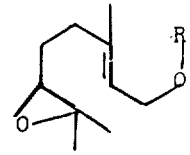

where R is:

i. a *m* or *p*-monosubstituted phenyl group in which the substituents are alkyl of 1–4 carbon atoms; alkoxy of 1–3 carbon atoms; alkylthiol of 1–3 carbon atoms or fluorine;
ii. 3 or 4 monosubstituted cycloalkyl in which the substituent is alkyl of 1–3 carbon atoms or alkoxy of 1–3 carbon atoms; or,
iii. alkoxy alkylene in which the alkylene group is a polymethylene group of 3–4 carbons and the alkoxy group contains 1–3 carbons.

These compounds mimic the hormonal activity of a natural insect juvenile hormone and are useful for controlling insect population by interfering with the normal growth or breeding stages of insect life.

3 Claims, No Drawings

INSECT HORMONE MIMICS

BACKGROUND OF THE INVENTION i. Field of the Invention

This invention relates to novel geranoil and 6,7 epoxygeranyl ethers which mimic the action of a natural juvenile insect hormone.

ii. The Prior Art

It is known that a natural juvenile insect hormone having the formula

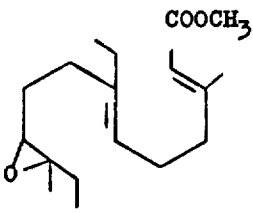

controls the metamorphosis of insects from the larval state to the adult stage.

In June 1968 at the Gordon Research Conference, W. S. Bowers reported that the compound:

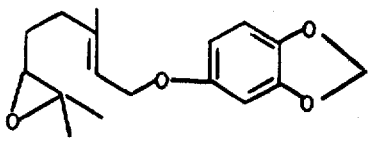

had hormonal activity similar to the natural juvenile insect hormone.

The present invention is directed to yet other compounds which mimic the action of the natural juvenile insect hormone and which are thus valuable in controlling insects.

SUMMARY OF THE INVENTION

The novel compounds of the present invention can be described by the formulae:

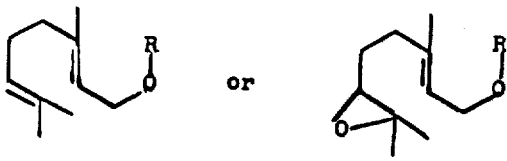

wherein R is i. a m or p-monosubstituted phenyl group in which the substituent is alkyl of 1–4 carbon atoms, alkoxy of 1–3 carbon atoms, alkylthiol of 1–3 carbon atoms or fluorine.

ii. 3- or 4-monosubstituted cyclohexyl in which the substituent is alkyl of 1–3 carbon atoms, alkoxy of 1–3 carbon atoms, or iii. an alkoxy tri- or tetramethylene group in which the alkoxy group has from 1–3 carbon atoms.

The invention also comprehends the control of insect population where metamorphosis from the larval stage is inhibited by the juvenile hormone

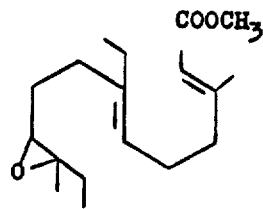

by contacting the insect in an immature stage with an effective dose of one of the above compounds.

DETAILED DESCRIPTION OF THE INVENTION

The geranyl ethers are generally prepared by reaction of geranyl bromide with a suitable phenoxide or alkoxide of an alkali or alkaline earth metal. The phenoxides are readily prepared by reaction of the phenol with alkali or alkaline earth metals, their oxides, alkyls or alkoxides. Sodium hydride or sodium alkoxide are somewhat preferred in view of their ready availability and low cost. The phenol and hydride, or its equivalent, are generally used in equimolar ratios though this may vary from 9:10 to 10:9, i.e., about a 10% excess of one reactant will give satisfactory results.

The alkoxides can also be prepared by reaction of alcohols with alkali and alkaline earth metal hydrides and alkyls. Substituted cyclohexanols are rather slow in reaction and it is preferred to use alkali metal alkyls such as lithium alkyls. Butyllithium is a convenient reagent that is commercially available.

The epoxidation of the phenol ethers may be effected by any convenient peracid and preferably by an organic peracid, i.e., peracetic, perbenzoic, m-chloroperbenzoic.

The above reactions employed in the synthesis of the compounds of this invention are generally run in an aprotic solvent such as ethers, alkanes and haloalkanes. Preferred solvents are ethers such as diethyl ether, dimethoxyethane, and methylene chloride.

When the R group is a phenyl group substituted in the m- or p- position with an alkylthiol group, oxidation of the geranyl ether with a peracid will oxidize the sulfur linkage. Accordingly, the geranyl sulfide ethers are epoxidized indirectly by treating the geranyl sulfide ether with N-bromosuccinimide in aqueous dimethoxyethane to form the geranylbromohydrin ether sulfoxide, E. E. Van Tamelen & T. J. Curphey, Tetrahedron Letters page 121 (1962). The bromohydrin compound is then treated with potassium carbonate in methanol to form the epoxide - sulfoxide. The sulfoxide group can then be selectively reduced to the sulfide linkage with hexachlorodisilane according to the procedure of K. Naumann, G. Zon & K. Mislow, J. Am. Chem. Soc. 91 7012 (1969).

Technical grade geraniol can be used but the yields are usually low and purification is slow and tedious. Best results are obtained by use of crude geranyl bromide prepared from a high grade of geranoil. The geranyl bromide is prepared according to the procedure of Wagner-Jauregg and Arnold, Ann. 529, 274 (1937).

The compounds of the present invention mimic the action of the natural juvenile hormone.

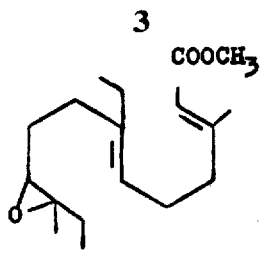

i.e., methyl trans,trans,cis-10-epoxy-7-ethyl-3,11-dimethyl-2,6-tridecadienoate, which can for convenience be called JH. JH is so named because it acts to inhibit metamorphosis causing immature insects to retain their juvenile characteristics.

The compounds are all derivatives of geraniol

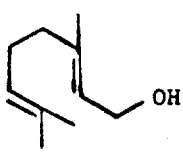

which is etherified as described above with the appropriate substituted phenol, substituted cycloalkanyl or ω-alkoxy alcohol and thereafter epoxidized if desired. The compounds of this invention therefore fall into the following subclasses:

(a) 

wherein R' is $m$ or $p$ to the ether linkage and can be alkyl of 1–4 carbon atoms, alkoxy of 1–3 carbon atoms, alkylthiol of 1–3 carbon atoms or fluorine;

(b) 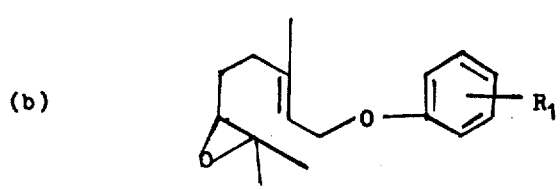

wherein R' is defined as in (a) above;

(c) 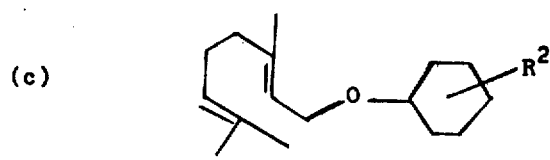

wherein $R^2$ is in the 3 or the 4 position of the cyclohexyl ring and can be alkyl of 1–3 carbons, or alkoxy of 1–3 carbons;

(d) 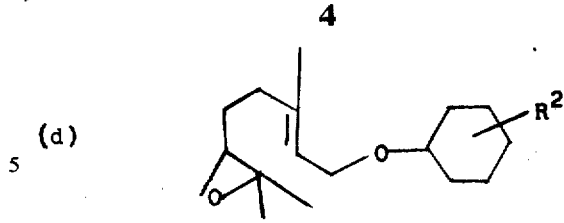

wherein $R^2$ is defined as in (c) above;

(e) 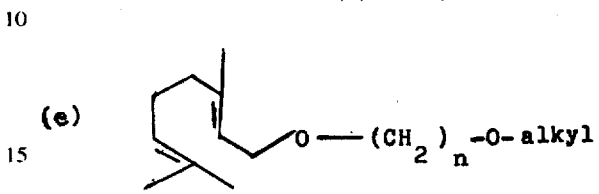

wherein $n$ is 3 or 4 and the alkyl group is of 1–3 carbon atoms; and, (f) 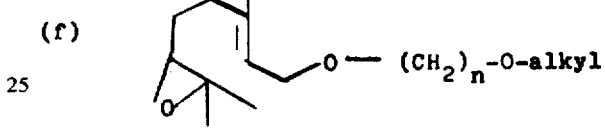

wherein $n$ and alkyl are as in (e) above.

The compounds of the present invention can be made by simple processes from readily available materials. These substances can be employed for controlling insects by simple contact, thereby preventing the insects from reaching the mature adult state and reproducing to destructive proportions. In some instances, substantial proportions of the immature insects contacted by the compounds are killed.

The compounds can be applied in the pure crude form or mixtures of the same can be applied. More usually, since the amounts required for control are relatively small, the compounds of this invention will be formulated with other ingredients.

It is often desirable to provide slow-release formulations for use in outdoor situations where leaching and run-off could remove the hormones from the locus to be protected or where a delayed response is desired. With wettable powders and dusts this can be accomplished by dispersing the active mixture in a water insoluble or slightly soluble resin and then grinding coarsely. Granules are particularly effective in this case, where the matrix for the granule can be a resin or wax, or the particulate matter can be cemented with binders such as asphalt to provide the desired slow-release characteristics.

The JH-active substances, when formulated as described and applied to the locus to be protected give good control of a large number of arthropods by interfering with the pupation process. While the quantities and proportions of the compounds needed for control vary widely depending on the insect to be controlled, the environment in which the insect is found, the various stages of the egg, larvae or pupae and other variables, quantities of about 100 kg./ha., or 1000 parts by weight per million weight parts of the medium in which the insect exists are generally sufficient for control.

To control mosquitoes the compounds are deposited in the water where the mosquitoes are breeding. The compounds can be sprayed, dusted, or applied in granule or pellet form. The amount used generally depends on the volume of water in the marsh, swamp, bog or other locus to be treated. A sufficient quantity should be used to obtain a concentration of from 5 to 20 ppm. in the water depending on the susceptibility of the mosquito larvae and the degree of control desired.

Members of the order Hemiptera may be controlled by applying the compounds of this invention to the locus where the insects occur. These compounds prevent the normal maturing of the nymphs. Since the nymphs are unable to become adult, population buildup is effectively halted.

Stored grain products may be effectively protected by adding these compounds to the grain as it is being stored. Compounds may be formulated with wheat dust, flour or other such natural products and when evenly distributed in the grain at about 1000 ppm. effectively prevent population from expanding to destructive proportions by preventing the larvae from maturing.

The JH-active hormone mimics affect a very broad spectrum of insects and mites including agricultural pests, stored grain pests and household pests as well as those which attack animals and man. Examples of such insects and mites include, but are not limited to: alfalfa weevel, *Hypera postica*; confused flour beetle, *Tribolium confusum*; granary weevil, *Sitophilus granarius*; rice weevil, *Sitophilus oryzae*; cadell, *Tenebroides mauritanicus*; saw-toothed grain beetle, *Oryzaephilus surinamensis*; Angoumois grain moth, *Sitotroga cerealella*; Indian meal moth, *Plodia interpunctella*; Mediterranean flour moth, *Ephestia kuhniella*; cockroaches such as *Peripelaneta americana*; and *Blatella germanica*; termites such as Reticulitermes spp., Heterotermes spp., Kalotermes spp., and others; house and stable flies such as *Musca domestica* and *Stomoxys calcitrans*; mosquitoes such as Anopheles spp., Aelex spp. and Aedes spp.; thrips such as *Taeniothrips simplex*, *Limothrips cerealium* and others; tarnished plant bugs, Lygus spp. and other mirids; clothes moths, Tinea spp., Tineola spp., and others; grasshoppers such as Melanoplus spp., Camnula spp. and others; carpet beetles such as Anthreus spp. and Attagenos spp.; ticks such as Boophilos spp., Melanophagus spp. and others; fleas, such as ctenocephalides spp., Pulex spp., Xenopsylla spp., and others; lice, such as Pediculus spp., Linognathus spp., Bovicola spp., and others; mites such as Tetranychus spp., *Panonychus ulmi*, and others; and the cotton stainer, *Dysdercus suturellus*.

The advantage of employing mimics of natural hormones for insect control is two-fold. Insects could not be expected to develop resistance to these substances and the compounds and their decomposition products are not expected to be toxic to mammals.

Combinations of the compounds of this invention with conventional short-residual insecticides are very useful. The insecticides kill most of the young and adults and the compounds of this invention prevent the young of the insects which hatch later from maturing.

This invention is further illustrated by the following specific embodiments which should not, however, be construed as fully delineating the scope thereof.

EXAMPLE 1

A. Preparation of Geranyl m-Methoxyphenyl Ether

A reactor was charged with 2.64 g (0.065 mol) of sodium hydride/mineral oil dispersion. The mineral oil was removed by repeated washes and decantation with anhydrous petroleum ether. The reactor was then charged with 100 ml of ethylene glycol dimethyl ether (glyme) and the hyride suspension stirred and cooled under nitrogen. A glyme solution of 8.05 g (0.065 mol) m-methoxyphenol was added at a rate to maintain the internal temperature below 10°C. The mixture evolved a gas during this operation, following which the mixture was stirred at 0°–5°C. for 1 hour. Crude geranyl bromide (10.85 g, about 0.05 mol) was added and the mixture stirred at 25°C. for 18 hours during which time a white solid separated. The mixture was diluted with water and repeatedly extracted with hexane. The combined extracts were wahsed in turn with water, saturated sodium chloride solution, and dried over anhydrous magnesium sulfate. The solvent was evaporated at reduced pressure and the residual oil was chromatographed on 250 g of Silicar (5% water) with 1% ether in hexane. Bulb to bulb distillation at 130°C./0.1 mm gave 5.6 g, 43% of the theoretical yield, of geranyl m-methoxyphenyl ether.

The infrared spectrum had $\nu C=C$ at 6.00 $\mu$, aromatic bands at 13.2, 14.6 $\mu$. The nmr spectrum in deuteriochloroform had peaks at $\sigma$ 7.0 –7.3 (1H, m); 6.4–6.7 (3H, m, aromatic); 5.50 (1H, m); 5.12 (1H, vinyl); 4.49 (2H, d, J = 7 cps, $CH_2O$); 3.69 (3H, s, $OCH_3$), along with the usual geranyl peaks.

B. Preparation of 6,7-Epoxygeranyl m-Methoxyphenyl Ether

A reactor was charged with 3.0 g (11.5 mmol) of the geranyl ether of Part A and 25 ml of ether and the mixture stirred under nitrogen with ice-cooling. A solution of 2.60 g (12.8 mmol of m-chloroperbenzoic acid of 85% purity in 10 ml of ether was added at a rate to maintain the temperature below 10°C. The mixture was stirred at 5°C for 30 minutes and at 25°C for 5 hours. The solvent was evaporated at reduced pressure and the white solid residue repeatedly extracted with hexane. The combined hexane extracts were washed with saturated sodium bicarbonate and dried over magnesium sulfate. The solvent was evaporated at reduced pressure and the residual oil chromatographed on 150 g of Silicar (5% water) with 10% ether in hexane. The solvent was evaporated and the product distilled at 140°C/0.08 mm to give 2.20 g, 69% of the theoretical yield, of 6,7-epoxygeranyl m-methoxyphenyl ether.

The infrared spectrum had $\nu$ C=C at 6.01 $\mu$, epoxide at 11.5 $\mu$, aromatic bands at 13.2, 14.6 $\mu$. The nmr spectrum in deuteriochloroform had peaks at $\delta$ of 7.0–7.3 (1H, m); 6.7-7.4 (3H, m, aromatic); 5.53 (1H, m, vinyl); 4.50 (2H, d, J = 7 cps, $CH_2O$); 3.70 (3H, s, $OCH_3$); 2.64 (1H, t, epoxide); 1.23, 1.20 (3H each, s, epoxide $CH_3$), and other geranyl peaks.

Anal. Calcd. for $C_{17}H_{24}O_3$: C, 73.88; H, 8.76. Found: C, 73.78; H, 9.11; C, 74.03; H, 9.29.

EXAMPLE 2

A. Preparation of Geranyl 4-Methoxycyclohexyl Ether

A solution of 10.4 g (80 mmol) of 4-methoxycyclohexanol in 100 ml of glyme was cooled in ice and 50 ml of 1.6M hexane solution of butyllithium (80 mmol) was added at a rate to maintain the temperature at 0°–10°C. After an additional 30 minutes at 5°C, 13 g (60 mmol) of crude geranyl bromide was added and the mixture stirred at 25°C for 20 hours, during which time a white precipitate formed. The mixture was diluted with water and extracted with hexane. The combined extracts were washed in turn with water and saturated sodium chloride solution and dried over magnesium sulfate. Evaporation of the hexane at reduced pressure gave an oil that was chromatographed on 150 g of Silicar (5% water) with 2–4% ether in hexane. Evaporative distillation at 110°C/0.07 mm gave 2.81 g, 18% of the theoretical, of geranyl 4-methoxycyclohexyl ether.

The infrared spectrum had $\nu$ C=C at 6.00 $\mu$. The nmr spectrum in deuteriochloroform had peaks at $\delta$ of 5.0–5.5 (2H, m, vinyl); 4.01 (2H, d, J = 7 cps, CH$_2$O); 3.32 (5H, m, CHO, CH$_3$O) and other geranyl peaks.

Anal. Calcd. for $C_{17}H_{30}O_2$: C, 76.64; H, 11.35.

B. Preparation of 6,7-Epoxygeranyl 4-Methoxycyclohexyl Ether

The procedure of Example 1-B was essentially repeated with suitable adjustment of reagent quantities to oxidize the product of Example 2-A. The 6,7-epoxygeranyl 4-methoxycyclohexyl ether boiling at 130°C/0.3 mm was obtained in 90% yield.

EXAMPLES 3 – 14

Examples 3 to 14 summarize the preparation of various geranyl ethers employing the methods of Examples 1A and 2A above. The yield for each of the new compounds, boiling points or melting points and analyses are given in Table1 I. The structures of these compounds were confirmed by infrared and nmr spectroscopy.

EXAMPLES 15 – 26

Example 15 to 26 summarized in Table Ii show preparation and analytical data of the epoxy compounds corresponding to the geranyl ether of Examples 3 – 14. In each case the procedure of Example 1B was followed. The structure of these compounds were confirmed by infrared and nmr spectroscopy.

TABLE I

Geranyl Ethers

| Example | R | Yield (%) | BP[1] °C/mm | C Calcd. | C Found[2] | H Calcd. | H Found[2] |
|---|---|---|---|---|---|---|---|
| 3  | p—C$_6$H$_4$CH$_3$ | 65 | 115/0.15 | 83.55 | 83.87 | 9.90 | 10.45 |
| 4  | p—C$_6$H$_4$C$_2$H$_5$ | 52 | 105/0.04 | 83.66 | 83.44 | 10.14 | 10.13 |
| 5  | p—C$_6$H$_4$OCH$_3$ | 33 | mp 36–37 | 78.42 | 78.34 | 9.39 | 9.29 |
| 6  | p—C$_6$H$_4$OC$_2$H$_5$ | 36 | mp 29–30 | 78.79 | 78.81 | 9.55 | 9.46 |
| 7  | p—C$_6$H$_4$—F | 57 | 100/0.05 | | | | |
| 8  | 4—(CH)—CH$_3$[3] | 51 | 100/0.07 | 81.53 | 81.62 | 12.08 | 12.16 |
| 9  | —(CH$_2$)$_3$—OCH$_3$ | 20 | 100/0.006 | | | | |
| 10 | p—C$_6$H$_4$—nPr[4] | 66 | 125/0.08 | 83.77 | 83.64 | 10.36 | 10.27 |
| 11 | p—C$_6$H$_4$—iPr[4] | 59 | 120/0.08 | 83.77 | 83.54 | 10.36 | 10.35 |
| 12 | p—C$_6$H$_4$—tBu[4] | 68 | 125/0.04 | 83.86 | 83.56 | 10.56 | 10.91 |
| 13 | p—C$_6$H$_4$SCH$_3$ | 50 | 125/0.05 | 73.86 | 73.78 | 8.75 | 8.53 |
| 14 | 4—(CH)—C$_2$H$_5$ | 53 | 110/0.08 | 81.75 | 81.85 | 12.20 | 12.19 |

[1]Evaporative distillation.
[2]Average of two determinations.
[3](CH) = cyclohexyl.
[4]n—Pr = n—propyl; i—Pr = isopropyl; t—Bu = t—butyl.

TABLE II 6,7-Epoxygeranyl Ethers

| Example | R | Yield (%) | BP[1] °C/mm | C Calcd. | C Found[2] | H Calcd. | H Found[2] |
|---|---|---|---|---|---|---|---|
| 15 | p—C$_6$H$_4$CH$_3$ | 68 | 125/0.06 | 78.42 | 78.07 | 9.29 | 9.23 |
| 16 | p—C$_6$H$_4$C$_2$H$_5$ | 69 | 115/0.04 | 78.79 | 78.68 | 9.55 | 9.49 |
| 17 | p—C$_6$H$_4$OCH$_3$ | 75 | 140/0.04 | 73.88 | 74.41 | 8.76 | 9.04 |
| 18 | p—C$_6$H$_4$OC$_2$H$_5$ | 64 | 125/0.006 | 74.44 | 74.35 | 9.03 | 9.10 |
| 19 | p—C$_6$H$_4$F | 74 | 110/0.07 | | | | |
| 20 | 4—(CH)—CH$_3$[3] | 51 | 100/0.07 | 81.53 | 81.62 | 12.08 | 12.16 |
| 21 | —(CH$_2$)$_3$OCH$_3$ | 91 | 95/0.05 | | | | |
| 22 | p—C$_6$H$_4$—nPr[4] | 64 | 125/0.05 | 79.12 | 78.77 | 9.79 | 9.69 |
| 23 | p—C$_6$H$_4$—iPr[4] | 69 | 125/0.07 | 79.12 | 78.98 | 9.79 | 9.57 |
| 24 | p—C$_6$H$_4$—tBu[4] | 69 | 130/0.05 | 79.42 | 79.09 | 10.00 | 9.70 |
| 25 | p—C$_6$H$_4$SCH$_3$ | | | | | | |
| 26 | 4—(CH)—C$_2$H$_5$ | 54 | 115/0.05 | 77.09 | 76.87 | 11.50 | 11.49 |

[1]Evaporative distillation.
[2]Average of two determinations.
[3](CH) = cyclohexyl.
[4]n—Pr = n—propyl; i—Pr = isopropyl; t—Bu = t—butyl.

The use of the compounds of this invention in controlling insect pests is shown in the following examples

EXAMPLES 27 TO 40

*Tenebrio molitor* (yellow mealworm) is a beetle which infects stored grain and is a commonly used test species. The test compound is dissolved in acetone and the solution applied to the abdomen of a young pupa from which the adult develops. The $ED_{50}$ is the amount of compound necessary to severely deform half the test animals. These insects will not live or reproduce. Test data are assembled in Table III.

TABLE III

Test Data on Tenebrio
$ED_{50}$ (μg/Insect)

| R | Geranyl Ether | 6,7-Epoxygeranyl Ether |
|---|---|---|
| p—$C_6H_4CH_3$ | 1.2 | 0.027 |
| p—$C_6H_4C_2H_5$ | 0.30 | 0.0018 |
| p—$C_6H_4OCH_3$ | 0.76 | 0.078 |
| m$C_6H_4OCH_3$ | 2.2 | 0.45 |
| p—$C_6H_4OC_2H_5$ | 2.2 | 0.32 |
| p—$C_6H_4F$ | — | 2.2 |
| ⟨S⟩—$OCH_3$ | — | 0.026 |
| ⟨S⟩—$CH_3$ | > 5.0 | 1.25 |
| —$(CH_2)_4$—$OCH_3$ | — | 0.35 |
| p—$C_6H_4$—n—Pr | 3.9 | 0.12 |
| p—$C_6H_4$—i—Pr | 0.72 | 0.030 |
| p—$C_6H_4$—t—Bu | ca | 5 |
| p—$C_6H_4SCH_3$ | 0.084 | — |
| ⟨S⟩—$C_2H_5$ | > 5.0 | 0.94 |

EXAMPLES 41 TO 48

Control of Granary Weevil and Confused Flour Beetle

The granary weevil is another stored grain pest and in this test, the test compound is mixed with wheat and a known number of adult weevils is introduced. After 8 weeks the population of weevils is determined. The results are expressed in terms of the concentration required for 90% control of the population exclusive of kill. The data are shown in Table IV.

The confused flour beetle infests flour and the test is conducted as for the granary weevil but with flour instead of wheat. These data are also collected in Table IV.

TABLE IV

Acitivty of 6,7-epoxygeranyl ether in controlling Granary Weevil and Confused Flour Beetle

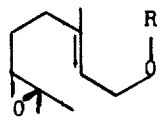

| | | Concentration in ppm for 90% Control of Population. | |
|---|---|---|---|
| Examples | | Granary Weevil | Confused Flour Beetle |
| 41 | p—$C_6H_4OCH_3$ | 1000 | 10–100 |
| 42 | m—$C_6H_4OCH_3$ | >1000 | 1000 |
| 43 | p—$C_6H_4F$ | 1000 | 1000 |
| 44 | p—$C_6H_4OC_2H_5$ | 1000 | 100 |
| 45 | p—$C_6H_4C_2H_5$ | 100 | 10 |
| 46 | p—$C_6H_4CH_3$ | 1000 | — |
| 47 | —$(CH_2)_3OCH_3$ | 1000 | 1000 |
| 48 | ⟨S⟩—$OCH_3$ | 100–1000 | 100 |

EXAMPLE 49

Control of *Aedes aegypti*, yellow fever mosquito: larvae of *Aedes aegypti* were reared in water. When the water contained from 0.1 to 1.0 ppm of either of the compounds of Examples 15 or 16, development of the larvae to the adult stage was inhibited.

EXAMPLE 50

When larvae of the Mexican bean beetle were fed foliage treated with from 100 to 500 ppm of the compound of Example 16, adult development was inhibited. None of the larvae pupated when this treatment began 9 days after hatch at 100 ppm.

EXAMPLE 51

Housefly development was inhibited by the compound of Example 16 when the larvae were dipped in a water dispersion and then recovered in mash containing 500 ppm of compound. Only 52% adults developed from the larvae. These adults laid 20% of the normal number of eggs and only 56% of the eggs hatched.

The foregoing detailed description has been given for clarity of understanding only and no unnecessary limitations are to be understood therefrom. The invention is not limited to the exact details shown and described for obvious modifications will be apparent to those skilled in the art.

The embodiments of an invention in which an exclusive property or privilege is claimed are defined as follows:

1. A compound having the formula wherein R is 3- or 4- monosubstituted cyclohexyl in which the substituent is alkyl or alkoxy of 1 to 3 carbon atoms.

2. A compound of claim 1 in which R is 4-methylcyclohexyl.

3. A compound of claim 1 in which R is 4-methorycyclohexyl.

* * * * *